US011501328B1

(12) United States Patent
Sandgren et al.

(10) Patent No.: US 11,501,328 B1
(45) Date of Patent: Nov. 15, 2022

(54) PROMOTION PROCESSING SYSTEM FOR PROCESSING A STORE PROMOTION AND RELATED METHODS

(71) Applicant: Inmar Clearing, Inc., Winston-Salem, NC (US)

(72) Inventors: Jeffrey Sandgren, Kernersville, NC (US); Amber Shew, Winston-Salem, NC (US); Forrest Gullion, Melrose, FL (US)

(73) Assignee: INMAR CLEARING, INC., Winston-Salem, NC (US)

( * ) Notice: Subject to any disclaimer, the term of this patent is extended or adjusted under 35 U.S.C. 154(b) by 7 days.

(21) Appl. No.: 16/777,022

(22) Filed: Jan. 30, 2020

(51) Int. Cl.
*G06Q 30/02* (2012.01)
*G06Q 20/20* (2012.01)

(52) U.S. Cl.
CPC ......... *G06Q 30/0238* (2013.01); *G06Q 20/20* (2013.01)

(58) Field of Classification Search
CPC ............................ G06Q 30/0238; G06Q 20/20
USPC ................................. 705/14.25, 38
See application file for complete search history.

(56) References Cited

U.S. PATENT DOCUMENTS

| 10,672,020 | B1* | 6/2020 | Reynolds | ............ G06Q 30/0229 |
| 2011/0145054 | A1* | 6/2011 | Chetty | .................. G06Q 20/20 |
| | | | | 705/16 |
| 2011/0251880 | A1* | 10/2011 | Butler | ................ G06Q 30/0225 |
| | | | | 705/14.13 |
| 2012/0066049 | A1* | 3/2012 | Muthugopalakrishnan | ................. |
| | | | | G06Q 20/387 |
| | | | | 705/14.26 |
| 2012/0191521 | A1* | 7/2012 | Kumawat | ............. G06Q 30/02 |
| | | | | 705/14.23 |
| 2016/0180382 | A1* | 6/2016 | Bhagwan | ........... G06Q 30/0255 |
| | | | | 705/14.53 |
| 2018/0075432 | A1* | 3/2018 | Byerley | .................. G07F 17/42 |

OTHER PUBLICATIONS

"Towards Interoperability in Mobile Coupons: Enabling Cross Retailer Coupon Validation"; Fuchs, Klaus, 2017.*

* cited by examiner

*Primary Examiner* — Victoria E. Frunzi
(74) *Attorney, Agent, or Firm* — Allen, Dyer, Doppelt + Gilchrist, P.A.

(57) ABSTRACT

A promotion processing system may include a point-of-sale (POS) terminal and a promotion processing server. The promotion processing server may include a memory for maintaining a database of product identifiers, and store promotion identifiers for store promotions corresponding to at least some of the product identifiers. The promotion processing server may also include a processor configured to cooperate with the POS terminal during a purchase transaction to obtain at least one product identifier presented at the POS terminal, and determine whether a store promotion identifier is presented at the POS terminal, and, when presented, determine a matching product identifier and restrict sending a digital promotion related thereto, and, when not presented, then permitting sending of the digital promotion.

13 Claims, 8 Drawing Sheets

PROMOTION PROCESSING SYSTEM FOR PROCESSING A STORE PROMOTION AND RELATED METHODS

TECHNICAL FIELD

The present application relates to the field of electronics, and, more particularly, to digital promotion systems, and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A promotion processing system may include a point-of-sale (POS) terminal and a promotion processing server that may include a memory for maintaining a database of a plurality of product identifiers, and a plurality of store promotion identifiers for store promotions corresponding to at least some of the product identifiers. The promotion processing server may also include a processor configured to cooperate with the POS terminal during a purchase transaction to obtain at least one product identifier presented at the POS terminal, and determine whether a store promotion identifier is presented at the POS terminal, and, when presented, determine a matching product identifier and restrict sending a digital promotion related thereto, and, when not presented, then permitting sending of the digital promotion.

The promotion processing server may be configured to cooperate with the POS terminal to apply the digital promotion to a product for purchase corresponding to the at least one product identifier presented at the POS terminal, for example. The promotion processing server may be configured to generate and communicate a code to the POS terminal along with the digital promotion to permit application of the digital promotion to a product for purchase corresponding to the at least one product identifier presented at the POS terminal, for example.

The code would otherwise permit stacking of the digital promotion and a corresponding one of the store promotions. The promotion processing server may be configured to restrict the sending of the digital promotion so that the corresponding store promotion and the digital promotion cannot be stacked, for example.

The store promotions may each have product purchase conditions associated therewith. The store promotion corresponding to the store promotion identifier presented at the POS terminal may be applied based upon satisfaction of the product purchase conditions, for example. The promotion processing server may be configured to cooperate with the POS terminal to apply the store promotion corresponding to the store identifier presented at the POS terminal to a product for purchase corresponding to the matching product identifier.

A method aspect is directed to a method of processing a promotion. The method may include using a promotion processing server to maintain, in a memory, a database of a plurality of product identifiers, and a plurality of store promotion identifiers for store promotions corresponding to at least some of the product identifiers. The method may include using the promotion processing server to cooperate with a point-of-sale (POS) terminal during a purchase transaction to obtain at least one product identifier presented at the POS terminal, and determine whether a store promotion identifier is presented at the POS terminal, and, when presented, determine a matching product identifier and restrict sending a digital promotion related thereto, and, when not presented, then permitting sending of the digital promotion.

A computer readable medium aspect is directed to a non-transitory computer readable medium for processing a promotion. The non-transitory computer readable medium includes computer executable instructions that when executed by a processor cause the processor to perform operations. The operations may include maintaining, in a memory, a database of a plurality of product identifiers, and a plurality of store promotion identifiers for store promotions corresponding to at least some of the product identifiers. The operations may also include cooperating with a point-of-sale (POS) terminal during a purchase transaction to obtain at least one product identifier presented at the POS terminal, and determine whether a store promotion identifier is presented at the POS terminal, and, when presented, determine a matching product identifier and restrict sending a digital promotion related thereto, and, when not presented, then permitting sending of the digital promotion.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
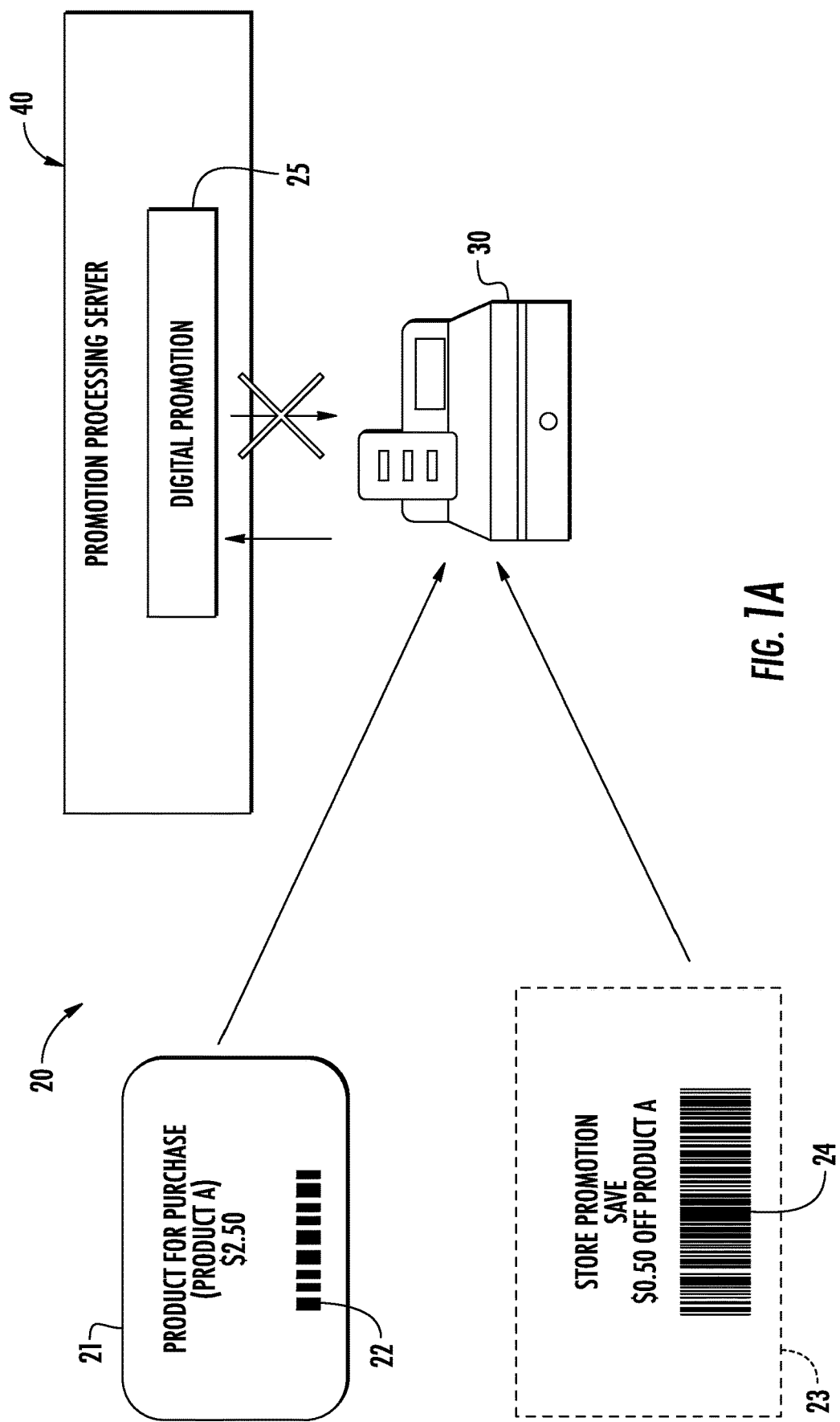
FIG. 1*a* is a schematic diagram of a promotion processing system in accordance with an embodiment.
Figure 1B:
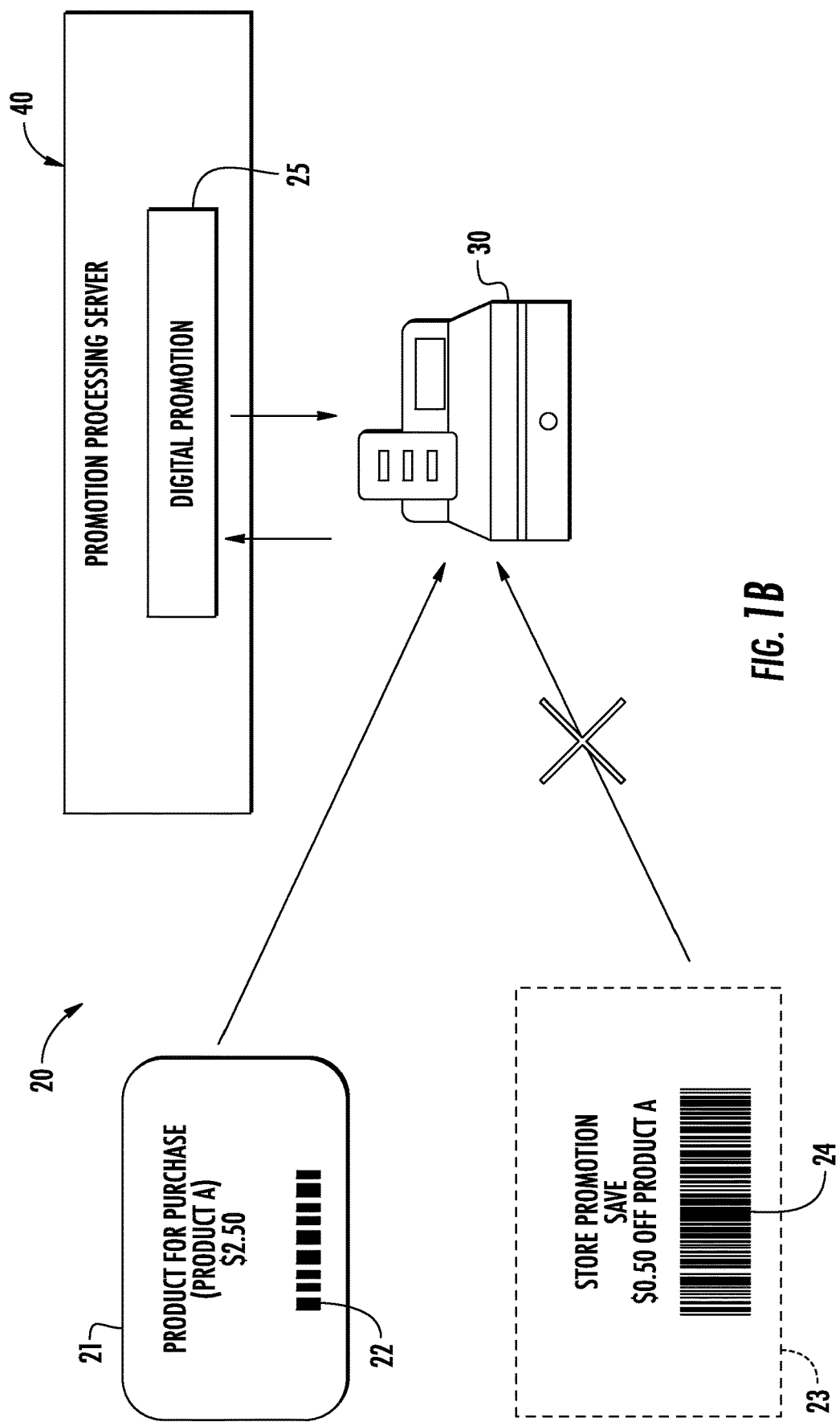
FIG. 1*b* is another schematic diagram of the promotion processing system of FIG. 1*a*.
Figure 2:
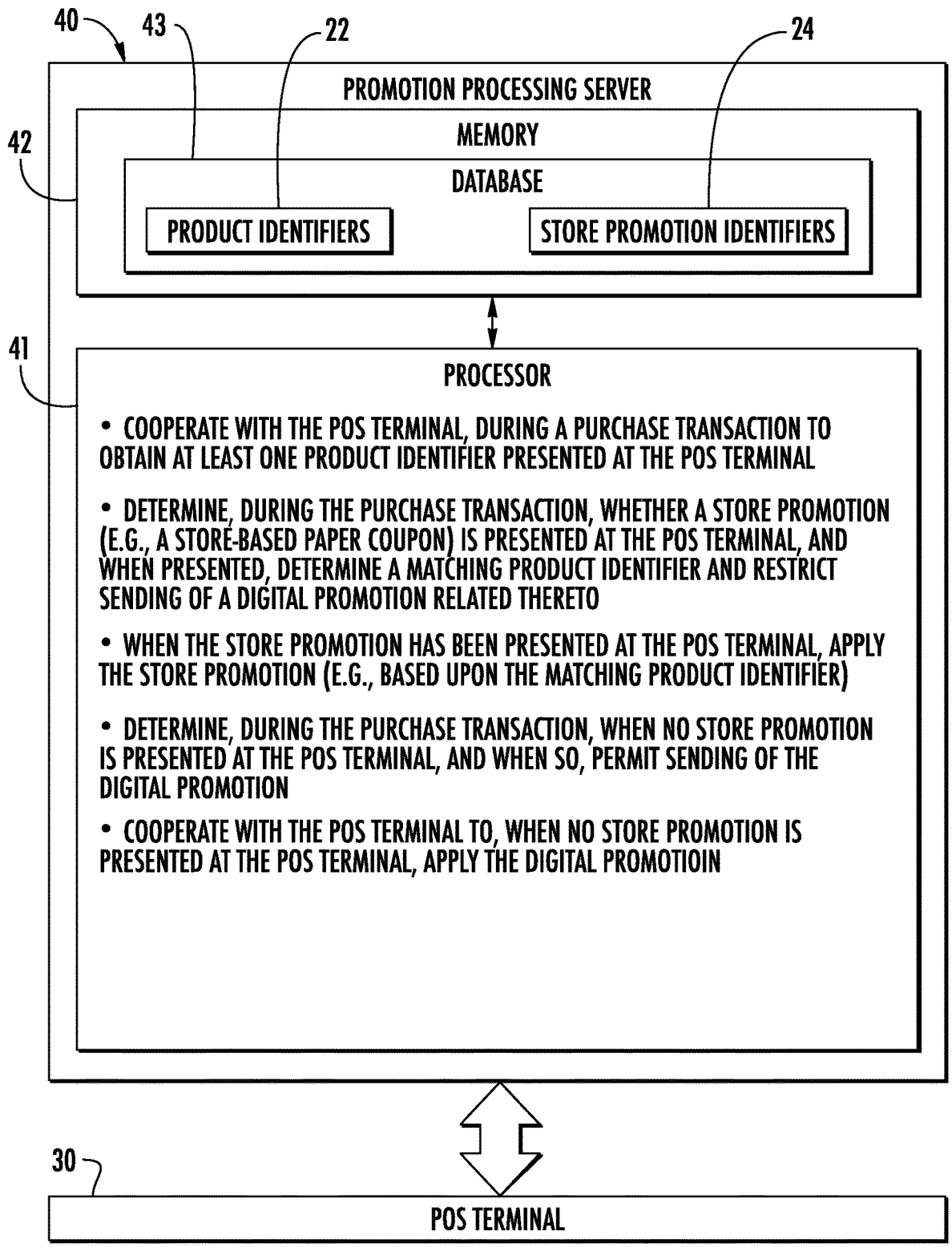
FIG. 2 is a schematic block diagram of the promotion processing system of FIGS. 1*a* and 1*b*.

Referring initially to FIGS. 1a-2 a promotion processing system 20 includes a point-of-sale (POS) terminal 30. The POS terminal 30 may be located adjacent a checkout at a given retailer, for example, and include one or more input devices (e.g., an optical scanner, keyboard) and a display for performing a purchase transaction.

The promotion processing system 20 also includes a promotion processing server 40. The promotion processing server 40 includes a processor 41 and a memory 42 associated with the processor. While operations of the promotion processing server 40 are described herein, it should be understood that the processor 41 and the memory 42 cooperate to perform the operations.

The memory 42 maintains a database 43 of product identifiers 22 (e.g., UPC codes) for products for purchase 21 and store promotion identifiers 24 (e.g., a unique code that identifies a store promotion 23 for a given product for purchase). The store promotion identifiers 24 are for store promotions 23 and correspond to at least one of the product identifiers 22. In other words, not each product identifier 22 may have a corresponding store promotion identifier 24 or not each product for purchase 21 may have a corresponding store promotion 23.

Figure 3:
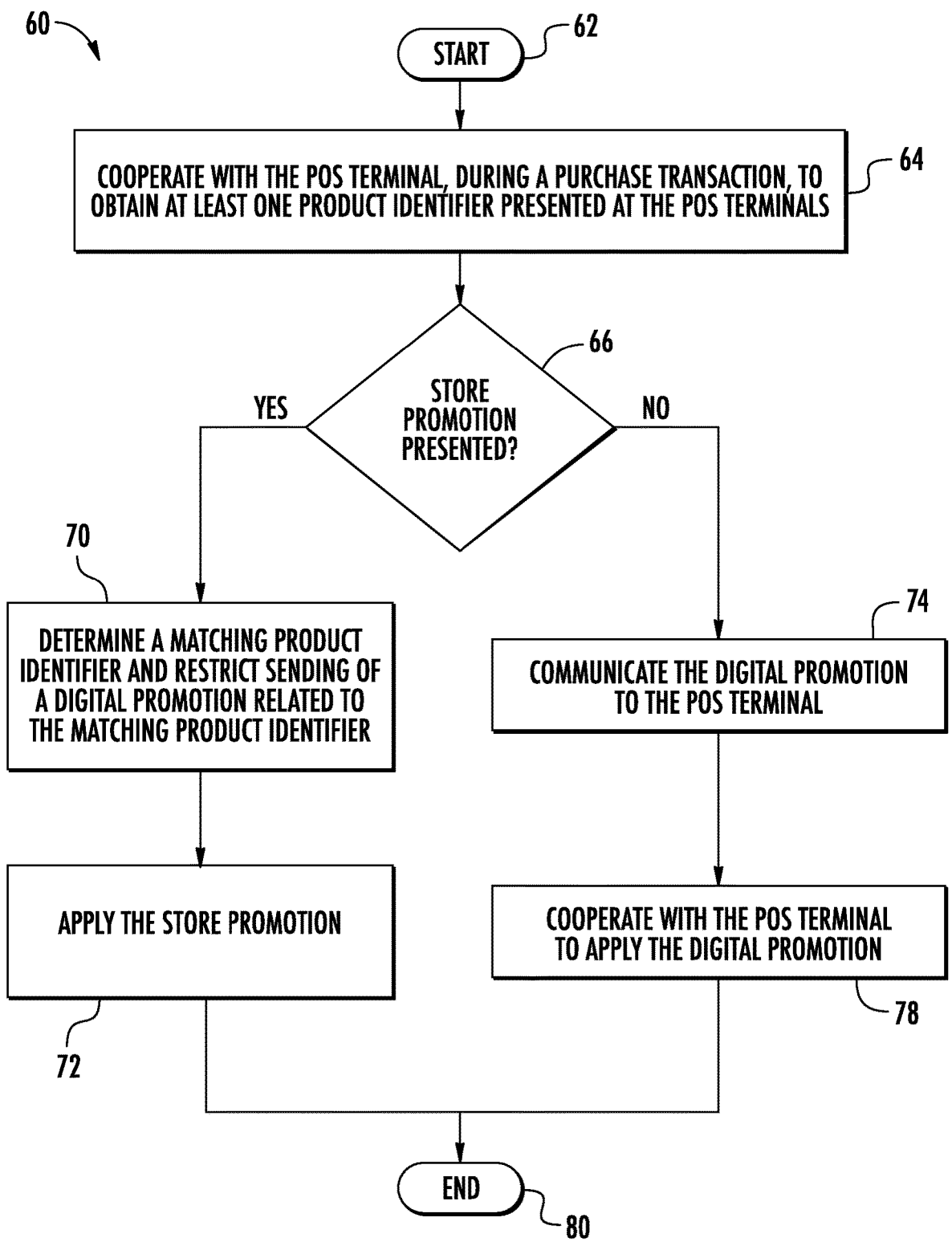
FIG. 3 is a flow diagram illustrating operation of the promotion processing server of FIG. 2.

Referring now to the flowchart 60 in FIG. 3, beginning at Block 62 operation of the promotion processing server 40 with respect to processing a promotion, and more particularly, a product for purchase 21 will now be described. The product for purchase 21 may be any item for purchase, for example, a food item or a gift card. The product for purchase 21 has a product identifier 22 associated therewith, for example, printed on the packaging of the product for purchase.

When a user is desirous of purchasing a product 21 at a retailer, for example, the user typically will present it for purchase at the POS terminal 30 during the checkout process. The promotion processing server 40 obtains the corresponding product identifier 22, for example, by optically scanning or manually keying the product identifier (Block 64). Those skilled in the art will appreciate that more than one product for purchase may be presented at the POS terminal 30 and thus obtained by the promotion processing server 40. Accordingly, the operations described herein may be applicable to multiple products for purchase during any given purchase transaction.

The promotion processing server 40 determines, during the purchase transaction of the product for purchase 21 (e.g., Product A), when a store promotion 23, for example, a paper or digital coupon from a retailer or store as opposed to a manufacturer's promotion, to be applied to the product for purchase 21 has been presented at the POS terminal 30 based upon an associated store promotion identifier 24 (e.g., in the form of a barcode or other code) associated with the store promotion (Block 66) (FIG. 1a). For example, some retailers may offer a promotion for a dollar amount off the purchase price of a product for purchase (e.g., $0.50 OFF Product A). In instances where the product for purchase 21 is a gift card, for example, the retailer may provide a discount off a given value physical gift card with the purchase of a threshold amount of products or services. The user or shopper would typically present the store promotion 23 during the checkout process (e.g., at any time during the checkout process, but typically at the end after inputting or scanning products but prior to processing payment or closing out the purchase transaction).

The promotion processing server 40 may determine whether the store promotion 23 has been presented at the POS terminal 30 based upon the store promotion identifier 24. The store promotion identifier 24 may be associated or designated, for example, by the store, for a particular store promotion 23 applicable to a given product for purchase. With respect to being presented at the POS terminal 30, those skilled in the art will appreciate that the store promotion 23 may be physically or directly presented at the POS terminal (e.g., a paper promotion or digital promotion on a user device), or indirectly presented (e.g., where the store promotion is digitally associated with the shopper or the shopper's basket, the shopper provides a shopper identifier or self-identifies, and the transaction is presented by the POS terminal to the promotion processing server 40).

Thus, when the shopper does present a store promotion 23 at the POS terminal 30 during the purchase transaction for a product for purchase 21 (Block 66), the promotion processing server 40 determines a matching product identifier 22 and restricts sending of a digital promotion 25 corresponding to the store promotion (e.g., same value, promotion, or product for purchase) to the POS terminal (Block 70). In other words, the promotion processing server 40 looks in the database 43 for a matching product for the presented store promotion 23, and when one is located, this may be indicative that a related digital promotion 25 (e.g., digital store promotion or digital manufacturer's coupon for the product for purchase 21) for the product is available, and thus to prevent stacking, does not communicate the digital promotion (FIG. 1a). The store promotion 23 is applied to the purchase of the product 21 (Block 72), for example, based upon the matching product identifier.

When the shopper does not present at the POS terminal 30 a store promotion 23 to be applied to the product for purchase 21 during the purchase transaction (Block 66), the promotion processing server 40 communicates the digital promotion 25 corresponding to the store promotion 23 to the POS terminal (Block 74) (FIG. 1b). The promotion processing server 40 cooperates with the POS terminal 30 to apply the digital promotion 25 to the purchase of the product for purchase 21 (Block 78). Operations end at Block 80.

Figure 4A:
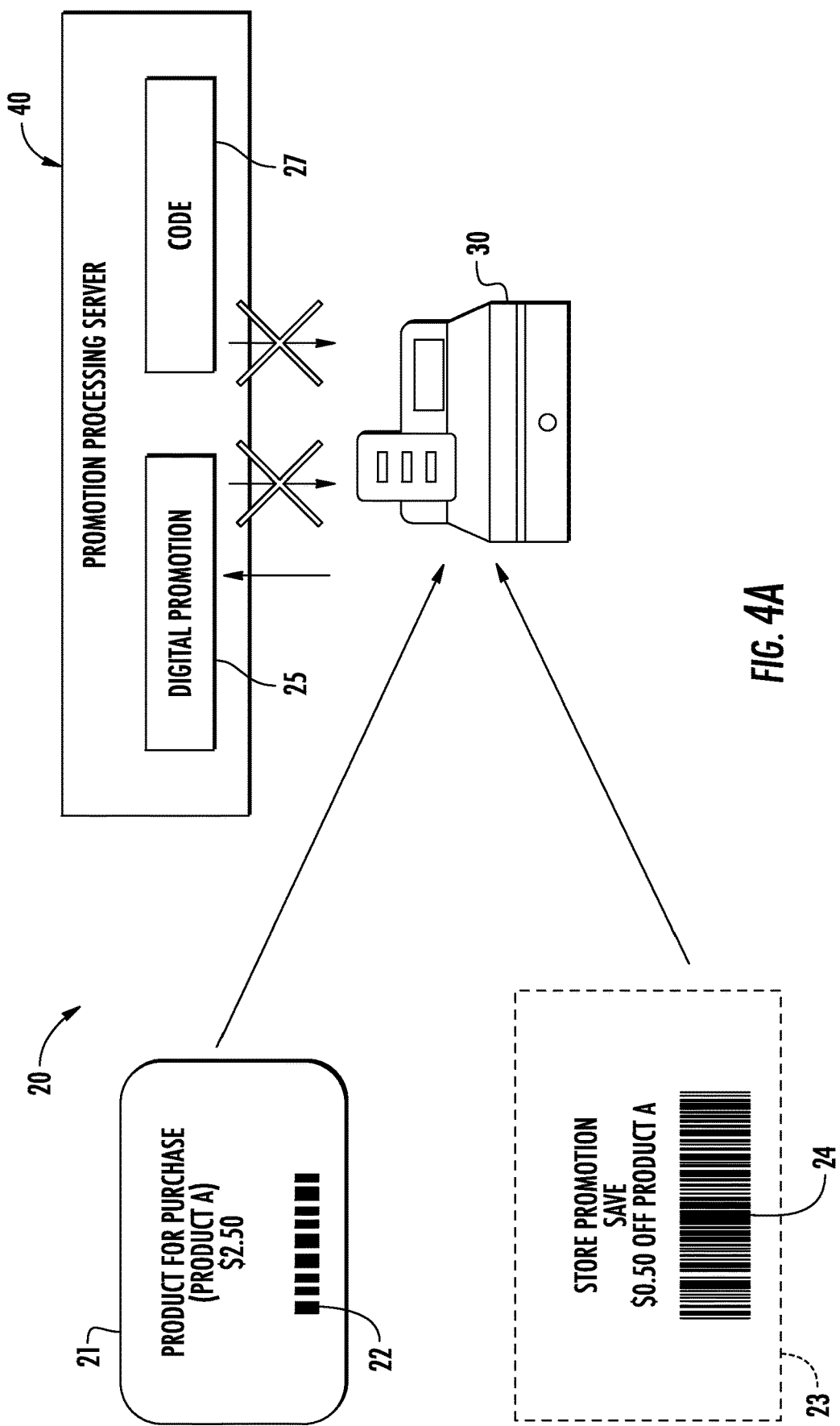
FIG. 4*a* is a schematic diagram of a promotion processing system in accordance with an embodiment.
Figure 4B:
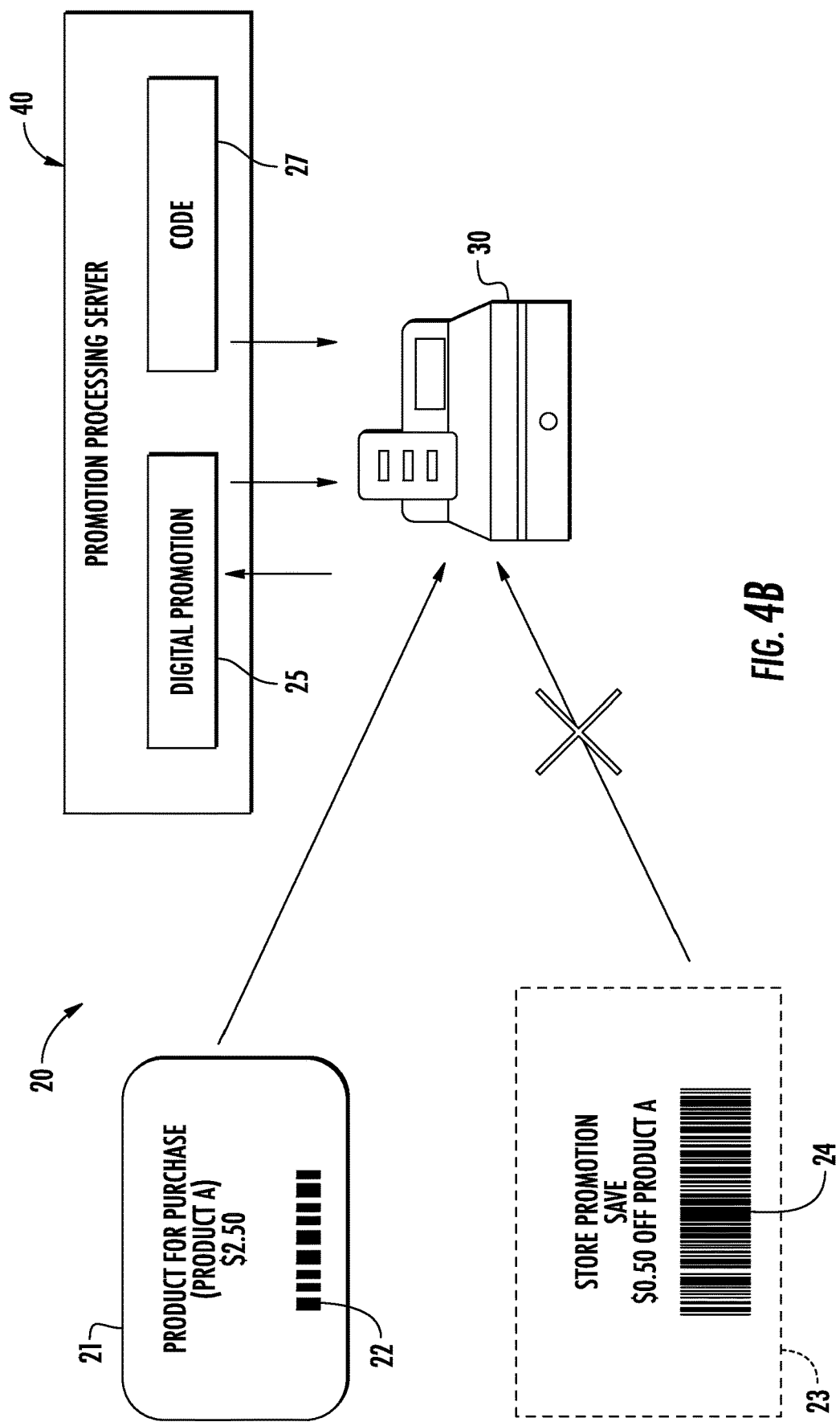
FIG. 4*b* is another schematic diagram of the promotion processing system of FIG. 4*a*.
Figure 5:
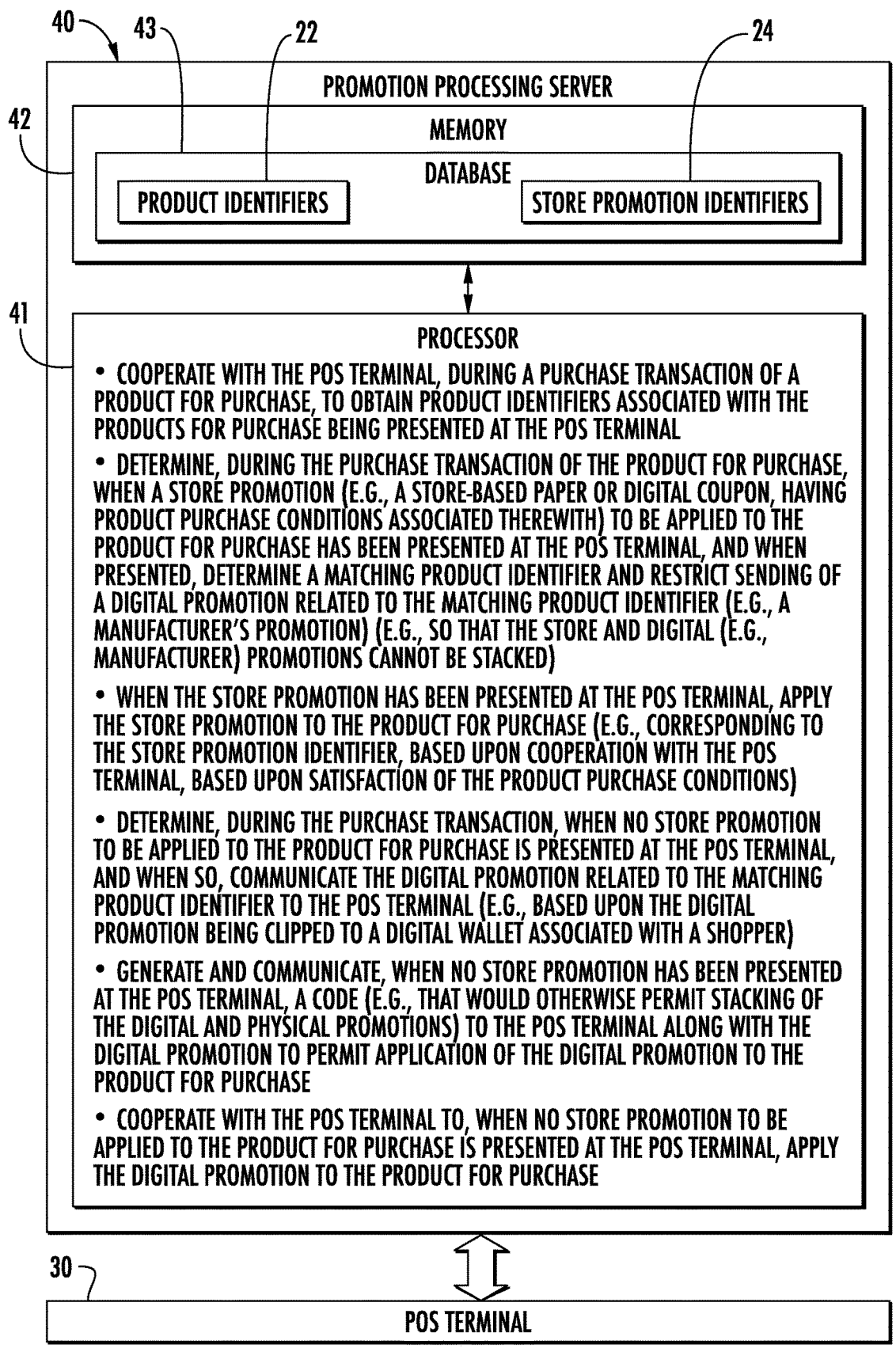
FIG. 5 is a more detailed schematic block diagram of the promotion processing system of FIGS. 4*a* and 4*b*.
Figure 6:
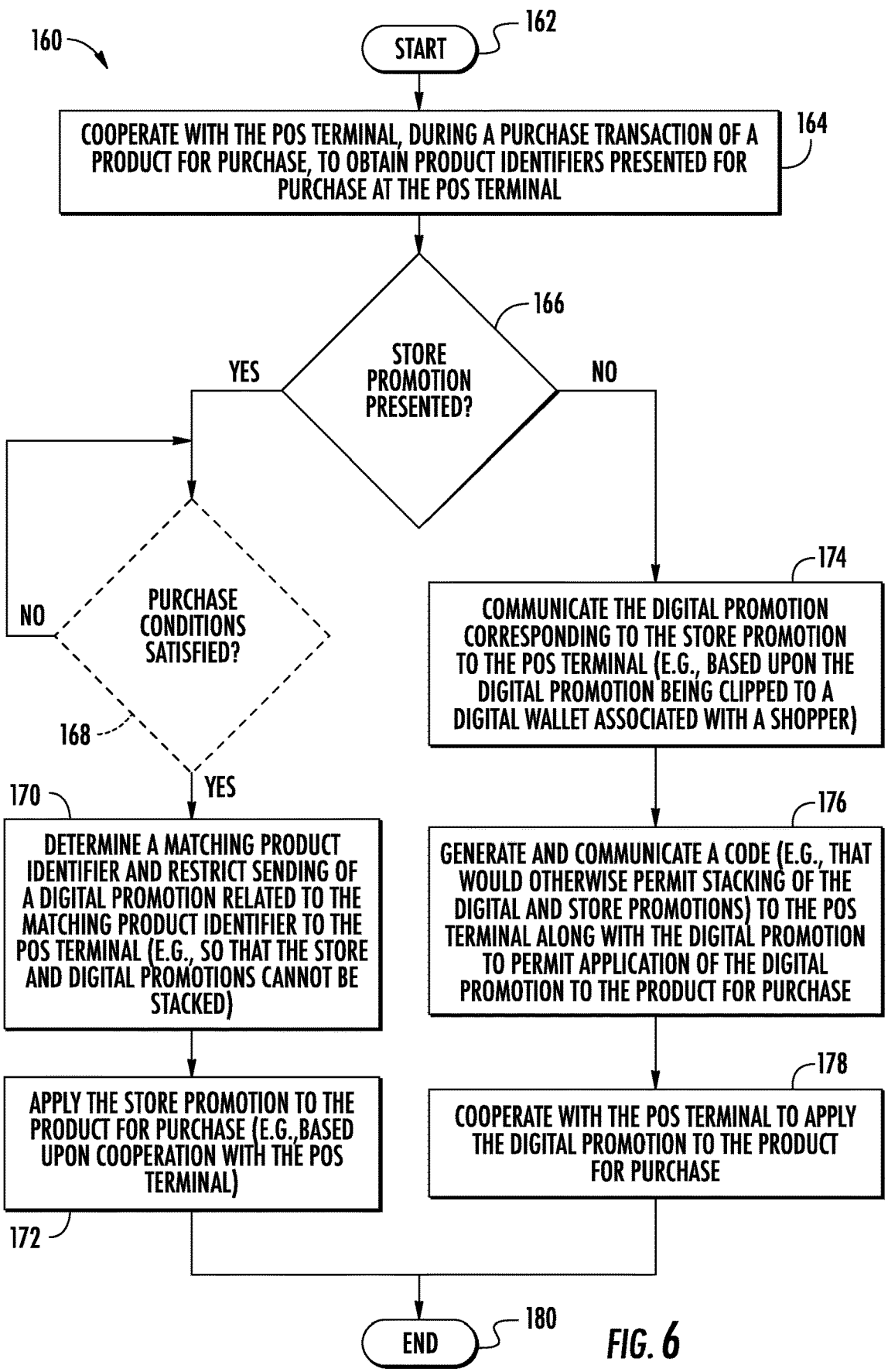
FIG. 6 is a flow diagram illustrating more detailed operation of the promotion processing server of FIG. 5.

Referring now to FIGS. 4a-5 and the flowchart 160 in FIG. 6, beginning at Block 162, more detailed operations of the promotion processing system 20 with respect to processing a promotion for the purchase of a product for purchase 21 will now be described. At Block 164, the promotion processing server 40 cooperates with the POS terminal 30, during a purchase transaction of a product for purchase 21, to obtain a product identifier 22 associated with the product for purchase being presented for purchase at the POS terminal. The product for purchase 21 may be "scanned" similar to other products being purchased during the purchase transaction. The product identifier 22 may be communicated by the POS terminal 30 to the promotion processing server 40. Alternatively, the promotion processing server 40 may retrieve the product identifier 22 from the POS terminal 30. Those skilled in the art will appreciate that a product identifier 22 identifies the product for purchase 21, (e.g., PLU 100) as such, differentiating it from other products.

The promotion processing server 40 determines, during the purchase transaction of the product for purchase 21, when a store promotion 23, for example, a paper coupon or digital coupon provided by the store or retailer, to be applied to the product for purchase has been presented at the POS terminal 30 based upon a store promotion identifier 24 associated with the store promotion (Block 166) (FIG. 4*a*). As noted above, the user or shopper typically presents the store promotion 23 during the checkout process (e.g., at any time during the checkout process, but typically. at the end after inputting or scanning products but prior to processing payment or closing out the purchase transaction).

When the shopper does present a store promotion 23 at the POS terminal 30 during the purchase of the product for purchase 21 (Block 166), the promotion processing server 40 may optionally determine whether purchase conditions have been satisfied or met (Block 168). For example, as noted above, some retailers may offer a promotion for a dollar amount off a given value physical gift card with the purchase of a threshold amount of products or services. In one exemplary implementation, a retailer may offer $10-OFF the purchase of a $50 physical gift card with the purchase of $50 of product, such as, for example, groceries, at the retailer. Thus, the promotion processing server 40 in the given implementation example would determine whether the product purchase conditions have been met, namely $50 of groceries have been purchased. In other embodiments, purchase conditions may include simply the purchase of the product for which there is a promotion. If the product purchase conditions are not satisfied (Block 168), the promotion processing server 40 may poll as products are being purchased and identification thereof is communicated to the promotion processing server until the product purchase conditions are met. If the purchase transaction is closed or ends prior to satisfying the product purchase conditions, the operations may end (Block 180).

Thus, also when the shopper presents a store promotion 23 at the POS terminal 30 during the purchase of the product for purchase 21 (Block 166), for example, as described above, and based upon the product purchase conditions being satisfied (Block 168) the promotion processing server 40 determines a matching product identifier 22 and restricts sending of a digital promotion 25 corresponding to the store promotion (e.g., same value or promotion) to the POS terminal (Block 170). In other words, the promotion processing server 40 looks in the database 43 for a matching product for the presented store promotion 23, and when one is located, this may be indicative that a related digital promotion (e.g., digital store promotion) for the product is available, and thus to prevent stacking, does not communicate the digital promotion 25 (FIG. 4*a*).

While restricting sending of the digital promotion 25 is illustratively performed based upon determining that the product purchase conditions have been satisfied (Block 168), restricting the sending of the digital promotion may be performed independently from the determination of whether the product purchase conditions have been met, for example, as this may be indicative that the shopper will continue to present the store promotion 23. The store promotion 23 is applied to the purchase of the product 21 (Block 172), for example, based upon the matching product identifier. In some embodiments, the promotion processing server 40 cooperates with the POS terminal 30 to apply the store promotion 23 to the purchase of the product for purchase 21. In some embodiments, the POS terminal 30 operates without cooperation with the promotion processing server 40 to apply the store promotion 23.

As will be appreciated by those skilled in the art, the digital promotion 25 may have been queued by the promotion processing server 40 for communicating to the POS terminal 30 for redemption but for the restriction. Queuing may occur, for example, when a shopper clips the digital promotion 25 to a digital wallet associated with the shopper. Of course, if both the digital promotion 25 and the store promotion 23 are able to be redeemed or stacked, the shopper may benefit by doubling the promotion. However, this may be undesirable by the seller, retailer, and/or manufacturer particularly for promotions having higher redeemable values (e.g. $10-OFF as described in the implementation example above). Accordingly, the promotion processing server 40 withholds or restricts sending of the digital promotion 25.

When the shopper does not present at the POS terminal 30 a store promotion 23 to be applied to the product for purchase 21 during the purchase transaction (Block 166), the promotion processing server 40 communicates the digital promotion 25 corresponding to the store promotion 23 to the POS terminal (Block 174) (FIG. 4*b*). In some embodiments, the digital promotion 25 may be communicated to the POS terminal 30 based upon the shopper clipping the digital promotion to a digital wallet associated with the shopper, which may be determined, for example, based upon a loyalty program identifier or other shopper identifier, as will be appreciated by those skilled in the art. In some embodiments, similar to the process described above, the promotion processing server 40 may determine whether purchase conditions have been satisfied or met prior to communicating the digital promotion 25.

The determination of whether the shopper presents a store promotion 23 may be made any time a store promotion identifier 24 is obtained or scanned at the POS terminal 30 and/or by the end of product "scanning" or input, which may be determined based upon input to the POS terminal from the shopper or salesperson, for example.

The promotion processing server 40, at Block 176, when the shopper does not present at the POS terminal 30 a store promotion 23 to be applied to the product for purchase 21 during the purchase transaction (Block 166), also generates and communicates a code 27 (e.g., a family code, such as family code 992) to the POS terminal 30 along with the digital promotion 25 (FIG. 4*b*). The code 27 permits the POS terminal 30 to apply the digital promotion 25 to the product for purchase 21. Otherwise, without receipt of the code 27, the POS terminal 30 does not permit application of the digital promotion 25 to the product for purchase 21.

The code 27 would otherwise permit stacking of the digital promotion 25 and the store promotion 21. In other words, the code 27 instructs the POS terminal 30 to skip stacking arbitration. Thus, by restricting the sending of the digital promotion 25 (and thus the code 27) to the POS terminal 30, the digital promotion and store promotion 21 cannot be stacked. Moreover, since the digital promotion 25 may be communicated with the code after product scanning, stacking may not be possible.

The promotion processing server 40 cooperates with the POS terminal 30 to apply the digital promotion 25 to the purchase of the product for purchase 21 (Block 178). Of course, similar to the store promotion 23, the promotion processing server 40 may determine whether product purchase conditions have been met prior to communicating the digital promotion 25 and/or applying the digital promotion. Operations end at Block 180.

Those skilled in the art will appreciate that the promotion processing system 20 described herein may be particularly beneficial for processing store promotions when there may be duplicate promotions, for example, from a manufacturer. A manufacturer's promotion presented at a POS terminal 30 may be readily identified based upon its unique identifier, that is, having a data string that begins with 8110. In contrast, a store promotion may be assigned any identifier by the store, and thus prevention of stacking may be difficult. The promotion processing system 20 may reduce stacking by matching or mapping store promotion identifiers to product identifiers (meaning, for example, that a digital promotion is available). The promotion processing system 20 reduces chances of stacking by restricting the sending of the digital promotion 25 and code 27 when a store promotion 23 to be applied to the product for purchase 21 is presented at the POS terminal 30. Moreover, the promotion processing system 20 described improves purchase and promotion processing technology by providing a more direct processing path (e.g., excluding additional processing components and instructions) for processing store and manufacturer promotions while addressing undesirable stacking.

A method aspect is directed to a method of processing a promotion. The method includes using a promotion processing server 40 to maintain, in a memory 42, a database 43 of a plurality of product identifiers 22, and a plurality of store promotion identifiers 24 for store promotions 23 corresponding to at least some of the product identifiers. The method also includes using the promotion processing server 40 to cooperate with a point-of-sale (POS) terminal 30 during a purchase transaction to obtain at least one product identifier 22 presented at the POS terminal, and determine whether a store promotion identifier 24 is presented at the POS terminal, and, when presented, determine a matching product identifier and restrict sending a digital promotion 25 related thereto, and, when not presented, then permitting sending of the digital promotion.

A computer readable medium aspect is directed to a non-transitory computer readable medium for processing a promotion. The non-transitory computer readable medium includes computer executable instructions that when executed by a processor 41 cause the processor to perform operations. The operations include maintaining, in a memory 42, a database 43 of a plurality of product identifiers 22, and a plurality of store promotion identifiers 24 for store promotions 23 corresponding to at least some of the product identifiers. The operations also include cooperating with a point-of-sale (POS) terminal 30 during a purchase transaction to obtain at least one product identifier 22 presented at the POS terminal, and determine whether a store promotion identifier 24 is presented at the POS terminal, and, when presented, determine a matching product identifier and restrict sending a digital promotion 25 related thereto, and, when not presented, then permitting sending of the digital promotion.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a point-of-sale (POS) terminal configured to scan a plurality of products for purchase during a purchase transaction; and
a promotion processing server comprising a memory for maintaining a database of a plurality of product identifiers, and a plurality of store promotion identifiers for store promotions corresponding to at least some of the product identifiers, and
a processor configured to
determine whether a given shopper clips at least one digital promotion to a digital wallet associated with the given shopper,
when the given shopper clips the at least one digital promotion to the digital wallet
queue for communication from the digital wallet to the POS terminal during the purchase transaction at the POS terminal, the at least one digital promotion clipped to the digital wallet,
obtain, during the purchase transaction at the POS terminal, a shopper identifier and at least one product identifier presented at the POS terminal, and
determine whether a store promotion identifier is presented at the POS terminal during the purchase transaction based upon one of, at the POS terminal, scanning of the store promotion identifier from the corresponding store promotion and manual entry of the store promotion identifier from the corresponding store promotion during scanning of the plurality of product for purchase, and, when presented
determine a matching product identifier to the queued at least one digital promotion clipped to the digital wallet, and restrict sending of the matched queued at least one digital promotion clipped to the digital wallet so that the matched queued at least one digital promotion and a corresponding store promotion cannot be stacked, and
when the store promotion identifier is not presented at the POS terminal during the purchase transaction
generate and communicate a family code of a uniform product code (UPC) to the POS terminal that causes the POS terminal to permit application of the queued at least one digital promotion, the family code permitting stacking of the queued at least one digital promotion and the corresponding store promotion, and
communicate the queued at least one digital promotion from the digital wallet to the POS terminal for redemption thereat and based upon the shopper identifier.

2. The promotion processing system of claim 1 wherein the promotion processing server is configured to cooperate with the POS terminal to apply the digital promotion to a product for purchase corresponding to the at least one product identifier presented at the POS terminal.

3. The promotion processing system of claim 1 wherein the store promotions each have product purchase conditions associated therewith; and wherein the store promotion corresponding to the store promotion identifier presented at the POS terminal is applied based upon satisfaction of the product purchase conditions.

4. The promotion processing system of claim 1 wherein the promotion processing server is configured to cooperate with the POS terminal to apply the store promotion corresponding to the store promotion identifier presented at the POS terminal to a product for purchase corresponding to the matching product identifier.

5. The promotion processing system of claim 1 wherein at least one of the store promotions comprises a paper coupon.

6. A promotion processing server comprising:
a memory for maintaining a database of a plurality of product identifiers, and a plurality of store promotion identifiers for store promotions corresponding to at least some of the product identifiers; and
a processor configured to
determine whether a given shopper clips at least one digital promotion to a digital wallet associated with the given shopper,
when the given shopper clips the at least one digital promotion to the digital wallet
queue for communication from the digital wallet to a point-of-sale (POS) terminal during a purchase transaction at the POS terminal, the at least one digital promotion clipped to the digital wallet, the POS terminal being configured to scan a plurality of products for purchase during the purchase transaction,
obtain, during the purchase transaction at the POS terminal, a shopper identifier and at least one product identifier presented at the POS terminal, and
determine whether a store promotion identifier is presented at the POS terminal during the purchase transaction based upon one of, at the POS terminal, scanning of the store promotion identifier from the corresponding store promotion and manual entry of the store promotion identifier from the corresponding store promotion during scanning of the plurality of products, and, when presented
determine a matching product identifier to the queued at least one digital promotion clipped to the digital wallet, and restrict sending of the matched queued at least one digital promotion clipped to the digital wallet so that the matched queued at least one digital promotion and a corresponding store promotion cannot be stacked, and
when the store promotion identifier is not presented at the POS terminal during the purchase transaction
generate and communicate a family code of a uniform product code (UPC) to the POS terminal that causes the POS terminal to permit application of the queued at least one digital promotion, the family code permitting stacking of the queued at least one digital promotion and the corresponding store promotion, and
communicate the queued at least one digital promotion from the digital wallet to the POS terminal for redemption thereat and based upon the shopper identifier.

7. The promotion processing server of claim 6 wherein the processor is configured to cooperate with the POS terminal to apply the digital promotion to a product for purchase corresponding to the at least one product identifier presented at the POS terminal.

8. The promotion processing server of claim 6 wherein the store promotions each have product purchase conditions associated therewith; and wherein the store promotion corresponding to the store promotion identifier presented at the POS terminal is applied based upon satisfaction of the product purchase conditions.

9. The promotion processing server of claim 6 wherein the processor is configured to cooperate with the POS terminal to apply the store promotion corresponding to the store identifier presented at the POS terminal to a product for purchase corresponding to the matching product identifier.

10. A method of processing a promotion comprising:
using a promotion processing server to
maintain, in a memory, a database of a plurality of product identifiers, and a plurality of store promotion identifiers for store promotions corresponding to at least some of the product identifiers,
determine whether a given shopper clips at least one digital promotion to a digital wallet associated with the given shopper, and
when the given shopper clips the at least one digital promotion to the digital wallet
queue for communication from the digital wallet to a point-of-sale (POS) terminal during a purchase transaction at the POS terminal, digital promotions clipped to the digital wallet, the POS terminal being configured to scan a plurality of products for purchase during the purchase transaction,
obtain, during the purchase transaction at the POS terminal, a shopper identifier and at least one product identifier presented at the POS terminal, and
determine whether a store promotion identifier is presented at the POS terminal during the purchase transaction based upon one of, at the POS terminal, scanning of the store promotion identifier from the corresponding store promotion and manual entry of the store promotion identifier from the corresponding store promotion during scanning of the plurality of products, and, when presented
determine a matching product identifier to the queued at least one digital promotion clipped to the digital wallet, and restrict sending of the matched queued at least one digital promotion clipped to the digital wallet so that the matched queued at least one digital promotion and a corresponding store promotion cannot be stacked, and
when the store promotion identifier is not presented at the POS terminal during the purchase transaction
generate and communicate a family code of a uniform product code (UPC) to the POS terminal that causes the POS terminal to permit application of the queued at least one digital promotion, the family code permitting stacking of the queued at least one digital promotion and the corresponding store promotion, and
communicate the queued at least one digital promotion from the digital wallet to the POS terminal for redemption thereat and based upon the shopper identifier.

11. The method of claim 10 wherein using the promotion processing server comprises using the promotion processing server to cooperate with the POS terminal to apply the digital promotion to a product for purchase corresponding to the at least one product identifier presented at the POS terminal.

12. A non-transitory computer readable medium for processing a promotion, the non-transitory computer readable medium comprising computer executable instructions that when executed by a processor cause the processor to perform operations comprising:

maintaining, in a memory, a database of a plurality of product identifiers, and a plurality of store promotion identifiers for store promotions corresponding to at least some of the product identifiers;

determining whether a given shopper clips at least one digital promotion to a digital wallet associated with the given shopper; and when the given shopper clips the at least one digital promotion to the digital wallet queuing for communication from the digital wallet to a point-of-sale (POS) terminal during a purchase transaction at the POS terminal, at least one digital promotion clipped to the digital wallet, the POS terminal being configured to scan a plurality of products for purchase during the purchase transaction, obtaining, during the purchase transaction at the POS terminal, a shopper identifier and at least one product identifier presented at the POS terminal, and determining whether a store promotion identifier is presented at the POS terminal during the purchase transaction based upon one of, at the POS terminal, scanning of the store promotion identifier from the corresponding store promotion and manual entry of the store promotion identifier from the corresponding store promotion during scanning of the plurality of products for purchase, and, when presented determining a matching product identifier to the queued at least one digital promotion clipped to the digital wallet, and restricting sending of the matched queued at least one digital promotion clipped to the digital wallet so that the matched queued at least one digital promotion and a corresponding store promotion cannot be stacked, and when the store promotion identifier is not presented at the POS terminal during the purchase transaction generating and communicating a family code of a uniform product code (UPC) to the POS terminal that causes the POS terminal to permit application of the queued at least one digital promotion, the family code permitting stacking of the queued at least one digital promotion and the corresponding store promotion, and communicate the queued at least one digital promotion from the digital wallet to the POS terminal for redemption thereat and based upon the shopper identifier.

13. The non-transitory computer readable medium of claim 12 wherein the operations comprise cooperating with the POS terminal to apply the digital promotion to a product for purchase corresponding to the at least one product identifier presented at the POS terminal.

\* \* \* \* \*